United States Patent
Wang et al.

(10) Patent No.: US 8,368,965 B2
(45) Date of Patent: Feb. 5, 2013

(54) IMAGE CROPPING PROCESS (75) Inventors: Chiung-Sheng Wang, Taipei (TW); Sung-Hui Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 324 days.

(21) Appl. No.: 12/908,600

(22) Filed: Oct. 20, 2010

(65) Prior Publication Data

US 2012/0038954 A1  Feb. 16, 2012

(30) Foreign Application Priority Data

Aug. 13, 2010  (TW) .............................. 99127055 A (51) Int. Cl.
  H04N 1/40 (2006.01)
  G06K 15/00 (2006.01)
  G06K 9/42 (2006.01)
  G06K 9/36 (2006.01)
  G06K 9/32 (2006.01)

(52) U.S. Cl. ....... 358/3.28; 358/1.18; 358/2.1; 382/256; 382/282; 382/286; 382/291; 382/298

(58) Field of Classification Search ................ 358/3.28, 358/1.18, 2.1; 382/256, 282, 286, 291, 298
See application file for complete search history.

(56) References Cited

U.S. PATENT DOCUMENTS

| | | | |
|---|---|---|---|
| 6,456,745 B1 * | 9/2002 | Bruton et al. | 382/298 |
| 6,798,917 B2 * | 9/2004 | Fujiwara et al. | 382/240 |
| 8,199,357 B2 * | 6/2012 | Miyagi | 358/1.18 |
| 8,218,890 B2 * | 7/2012 | Turkelson et al. | 382/256 |
| 2009/0185752 A1 * | 7/2009 | Dwivedula et al. | 382/256 |
| 2009/0274393 A1 * | 11/2009 | Patel et al. | 382/298 |

* cited by examiner

*Primary Examiner* — Charlotte M Baker
(74) *Attorney, Agent, or Firm* — Kirton McConkie; Evan R. Witt (57) ABSTRACT

An image cropping process of a multifunction peripheral is provided. Firstly, a top edge endpoint of an object image is searched from a band image of an original image. Then, each band image of the original image is read to search the object endpoint coordinate of a to-be-printed object image zone. The object image zone is outputted to be printed. The image cropping process further provides a strategy for detecting spots in order to enhance the accuracy of searching the object image.

13 Claims, 9 Drawing Sheets

IMAGE CROPPING PROCESS

FIELD OF THE INVENTION

The present invention relates to an image cropping process, and more particularly to an image cropping process for use in an image processing method of a multifunction peripheral.

BACKGROUND OF THE INVENTION

Figure 1:
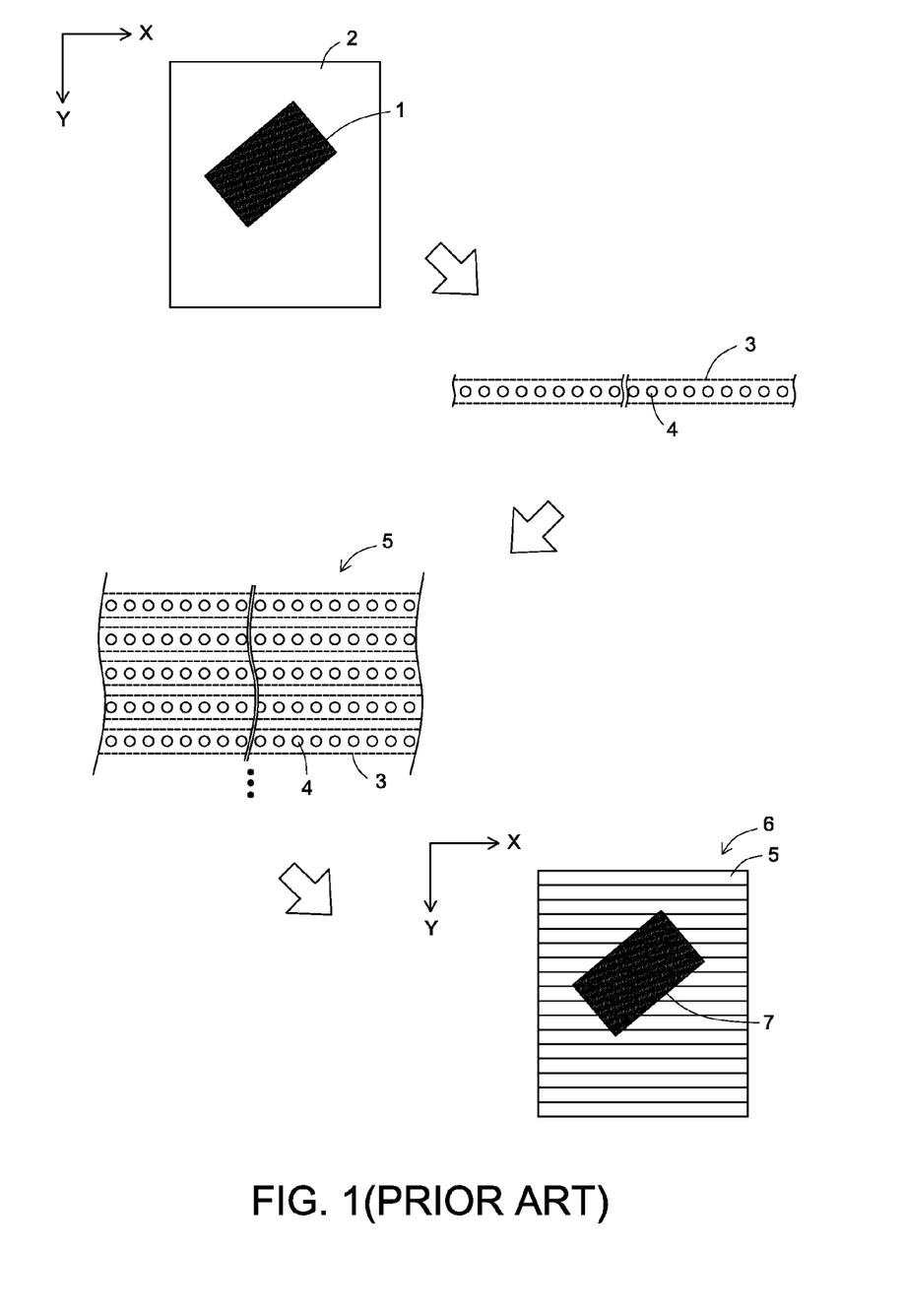
FIG. 1 schematically illustrates a process of performing a printing operation in a multifunction peripheral according to the prior art.

A multifunction peripheral is a device that performs a variety of functions of a scanner, a copier and a printer. Nowadays, multifunction peripherals become essential electronic devices for most enterprises or individual users. FIG. 1 schematically illustrates a process of performing a printing operation in a multifunction peripheral according to the prior art. Conventionally, for printing a document (e.g. a photo) by the multifunction peripheral, the photo 1 is firstly placed on a scanning window 2. Then, a scanning module within the multifunction peripheral is moved in a scanning direction Y to scan the photo 1. The scanned image data are successively stored into the dynamic memory within the multifunction peripheral on a line image basis. The line image 3 comprises plural pixels 4, which are arranged in a line. After several line images 3 stored in the dynamic memory are accumulated as a band image 5, the multifunction peripheral performs an image processing operation on the basis of a single band image 5. Then, plural processed band images 5 are combined as an original image 6, which is transmitted to the multifunction peripheral on a band image basis to be printed out.

Moreover, in a case that the document to be printed has a small image portion, the user may hope only the image portion is scanned because it is time-saving for the multifunction peripheral to scan only the image portion. As shown in FIG. 1, the original image 6 comprises an object image 7 and the rest of the object image 7 (i.e. a blank image). For acquiring only the object image 7, the multifunction peripheral usually provides an image cropping process. That is, before the scanning operation is done, a pre-scanning operation is performed to quickly scan the document at a low resolution. By performing the pre-scanning operation, the object image size of the original image and the desired scanning position can be recognized. After the actual range of the object image to be scanned is reset, the regular scanning operation will be done.

The pre-scanning operation used in the image cropping process, however, still has some drawbacks. For example, even if the area of the object image to be scanned is very small, the time for performing the pre-scanning operation is needed. For example, if a multifunction peripheral having an A3-sized scanning window is used to scan a 3×5 photo, the conventional image cropping process needs to firstly scan the A3-sized scanning window. After the position of the photo is recognized by an algorithm, the scanning range is reset and then the scanning operation is performed. Moreover, since the dynamic memory of the ordinary multifunction peripheral has a limited capacity, the original data produced by the pre-scanning operation need to be stored in the dynamic memory of the multifunction peripheral. The image data comprise the scanning data of the image zone and the data of the blank zone. Since the image data occupy a large portion of the dynamic memory, the image processing speed of the multifunction peripheral is impaired.

From the above discussions, the conventional image cropping process is time-consuming. Regardless of the object image size, a pre-scanning cycle is required and a large portion of the dynamic memory is occupied.

SUMMARY OF THE INVENTION

The present invention provides an image cropping process for cropping an image at a high processing speed.

The present invention also provides an image cropping process for reducing the occupancy of the dynamic memory of the multifunction peripheral.

In accordance with an aspect of the present invention, there is provided an image cropping process of a multifunction peripheral. The multifunction peripheral is configured to scan a document to acquire an original image and print the original image. The original image includes an object image. The original image is segmented into plural band images. Each of the band images includes plural line images.

The image cropping process includes steps of: (A) reading a band image of the original image; (B) judging whether a top edge endpoint coordinate of the object image is included in the read band image by sub-steps of: (B1) searching a first line image containing the object image from the read band image, and calculating two object endpoint coordinates of the first line image containing the object image; (B2) successively judging whether all of next plural line images of the first line image contain the two object endpoint coordinates; (B3) judging whether a width between two object endpoint coordinates of at least one line image of the next plural line images is greater than a preset width value, wherein if all of the judging conditions of the steps (B1), (B2) and (B3) are satisfied, each of the two object endpoint coordinates of the first line image is determined as the top edge endpoint coordinate, wherein if one of the judging conditions of the steps (B1), (B2) and (B3) is unsatisfied, the steps (A) and (B) are repeatedly performed until the top edge endpoint coordinate is determined; (C) calculating object endpoint coordinates of all line images following the plural line images of the band image; (D) outputting the object endpoint coordinate having the minimum X-axis coordinate value and the object endpoint coordinate having the maximum X-axis coordinate value among all object endpoint coordinates of the band image; (E) receiving the object endpoint coordinates outputted in the step (D) for further performing a printing processing operation; (F) reading a next band image, and searching all object endpoint coordinates of all line images of the next band image; (G) outputting the object endpoint coordinate having the minimum X-axis coordinate value and the object endpoint coordinate having the maximum X-axis coordinate value among all object endpoint coordinates of the next band image; (H) receiving the object endpoint coordinates outputted in the step (H) for performing the further printing processing operation; and (I) repeatedly performing the steps (F), (G) and (H).

In an embodiment, the step (B1) includes sub-steps of: (B1-1) reading a line image of the band image, and performing a Gamma correction on the line image, wherein the line image comprises plural pixels; (B1-2) judging whether the pixels of the line image contain the object image by horizontally scaling down the line image at a magnification to acquire a scaled-down line image, comparing grayscale values of respective pixels of the scaled-down line image with a grayscale threshold value to determine the pixel whose grayscale value is lower than the grayscale threshold value as an object pixel, and recording coordinates values of a leftmost object pixel and a rightmost object pixel of the object pixels of the scaled-down line image; and (B1-3) performing a pixel coordinate transformation by respectively transforming the coordinates values of the leftmost object pixel and the rightmost object pixel of the object pixels of the scaled-down line image into coordinates values of a leftmost object pixel and a rightmost object pixel of the object pixels of the line image, and recording the coordinates values of the leftmost object pixel and the rightmost object pixel of the object pixels of the line image as the two object endpoint coordinates.

In an embodiment, the grayscale threshold value W(n+1) is calculated by the following equation: W(n+1)=W(n)+(W(n+1)max−W(n))/T, where, n=0, 1, 2, . . . , (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

In an embodiment, if W(n+1)max is higher than W(n), T=Td, and if W(n+1)max is lower than W(n), T=Tu, wherein Tu and Td are different positive integers.

In an embodiment, the step (B1) includes sub-steps of: (B1-1) reading a line image of the band image, and performing a Gamma correction on the line image, wherein the line image comprises plural pixels; (B1-2) judging whether the pixels of the line image contain the object image by: horizontally scaling down the line image at a first magnification to acquire a first scaled-down line image; comparing grayscale values of respective pixels of the first scaled-down line image with a grayscale threshold value to determine the pixel whose grayscale value is lower than the grayscale threshold value as a would-be object pixel, and recording coordinates values of a leftmost would-be object pixel and a rightmost would-be object pixel of the would-be object pixels of the first scaled-down line image; subtracting a predetermined value from a X-axis coordinate value of the leftmost would-be object pixel of the first scaled-down line image to acquire a left reference coordinate, and adding the predetermined value to a X-axis coordinate value of the rightmost would-be object pixel to acquire a right reference coordinate; respectively transforming the left reference coordinate and the right reference coordinate into a leftmost reference coordinate and a rightmost reference coordinate of the line image, horizontally scaling down the line image between the leftmost reference coordinate and the rightmost reference coordinate at a second magnification to acquire a second scaled-down line image, comparing grayscale values of respective pixels of the second scaled-down line image with the grayscale threshold value to determine the pixel whose grayscale value is lower than the grayscale threshold value as an object pixel, and recording coordinates values of a leftmost object pixel and a rightmost object pixel of the second scaled-down line image, wherein the second magnification is greater than the first magnification; and (B1-3) performing a pixel coordinate transformation by respectively transforming the coordinates values of the leftmost object pixel and the rightmost object pixel of the second scaled-down line image into coordinates values of a leftmost object pixel and a rightmost object pixel of the object pixels of the line image, and recording the coordinates values of the leftmost object pixel and the rightmost object pixel of the object pixels of the line image as the two object endpoint coordinates.

In an embodiment, the grayscale threshold value W(n+1) is calculated by the following equation: W(n+1)=W(n)+(W(n+1)max−W(n))/T, where, n=0, 1, 2, . . . , (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

In an embodiment, if W(n+1)max is higher than W(n), T=Td, and if W(n+1)max is lower than W(n), T=Tu, wherein Tu and Td are different positive integers.

In an embodiment, the step (F) includes sub-steps of: (F-1) reading a line image of the next band image, and performing a Gamma correction on the line image, wherein the line image comprises plural pixels; (F-2) judging whether the pixels of the line image contain the object image by horizontally scaling down the line image at a magnification to acquire a scaled-down line image, comparing grayscale values of respective pixels of the scaled-down line image with a grayscale threshold value to determine the pixel whose grayscale value is lower than the grayscale threshold value as an object pixel, and recording coordinates values of a leftmost object pixel and a rightmost object pixel of the object pixels of the scaled-down line image; and (F-3) performing a pixel coordinate transformation by respectively transforming the coordinates values of the leftmost object pixel and the rightmost object pixel of the object pixels of the scaled-down line image into coordinates values of a leftmost object pixel and a rightmost object pixel of the object pixels of the line image, and recording the coordinates values of the leftmost object pixel and the rightmost object pixel of the object pixels of the line image as the two object endpoint coordinates.

In an embodiment, the grayscale threshold value W(n+1) is calculated by the following equation: W(n+1)=W(n)+(W(n+1)max−W(n))/T, where, n=0, 1, 2, . . . , (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

In an embodiment, if W(n+1)max is higher than W(n), T=Td, and if W(n+1)max is lower than W(n), T=Tu, wherein Tu and Td are different positive integers.

In an embodiment, the step (F) includes sub-steps of: (F-1) reading a line image of the next band image, and performing a Gamma correction on the line image, wherein the line image comprises plural pixels; (F-2) judging whether the pixels of the line image contain the object image by: horizontally scaling down the line image at a first magnification to acquire a first scaled-down line image; comparing grayscale values of respective pixels of the first scaled-down line image with a grayscale threshold value to determine the pixel whose grayscale value is lower than the grayscale threshold value as a would-be object pixel, and recording coordinates values of a leftmost would-be object pixel and a rightmost would-be object pixel of the would-be object pixels of the first scaled-down line image; subtracting a predetermined value from a X-axis coordinate value of the leftmost would-be object pixel of the first scaled-down line image to acquire a left reference coordinate, and adding the predetermined value to a X-axis coordinate value of the rightmost would-be object pixel to acquire a right reference coordinate; and respectively transforming the left reference coordinate and the right reference coordinate into a leftmost reference coordinate and a rightmost reference coordinate of the line image, horizontally scaling down the line image between the leftmost reference coordinate and the rightmost reference coordinate at a second magnification to acquire a second scaled-down line image, comparing grayscale values of respective pixels of the second scaled-down line image with the grayscale threshold value to determine the pixel whose grayscale value is lower than the grayscale threshold value as an object pixel, and recording coordinates values of a leftmost object pixel and a rightmost object pixel of the second scaled-down line image, wherein the second magnification is greater than the first magnification; and (B1-3) performing a pixel coordinate transformation by respectively transforming the coordinates values of the leftmost object pixel and the rightmost object pixel of the second scaled-down line image into coordinates values of a leftmost object pixel and a rightmost object pixel of the object pixels of the line image, and recording the coordinates values of the leftmost object pixel and the rightmost object pixel of the object pixels of the line image as the two object endpoint coordinates.

In an embodiment, the grayscale threshold value W(n+1) is calculated by the following equation: $W(n+1)=W(n)+(W(n+1)max-W(n))/T$, where, $n=0, 1, 2, \ldots, (A-1)$, $W(0)$ is an initial grayscale value, $W(n)$ is an accumulated reference grayscale value of the $n^{th}$ line image, $W(n+1)max$ indicates the maximum grayscale value among all pixels of the $(n+1)^{th}$ scaled-down line image that is obtained by horizontally scaling down the $n^{th}$ line image at a magnification, and T and A are positive integers.

In an embodiment, if W(n+1)max is higher than W(n), T=Td, and if W(n+1)max is lower than W(n), T=Tu, wherein Tu and Td are different positive integers.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides an image cropping process for use in an image processing method of a multifunction peripheral. By the image cropping process of the present invention, an object image is cropped from the original image in real time during a printing operation is performed by the multifunction peripheral and an image processing method is implemented. As a consequence, the printing speed is enhanced.

Figure 2:
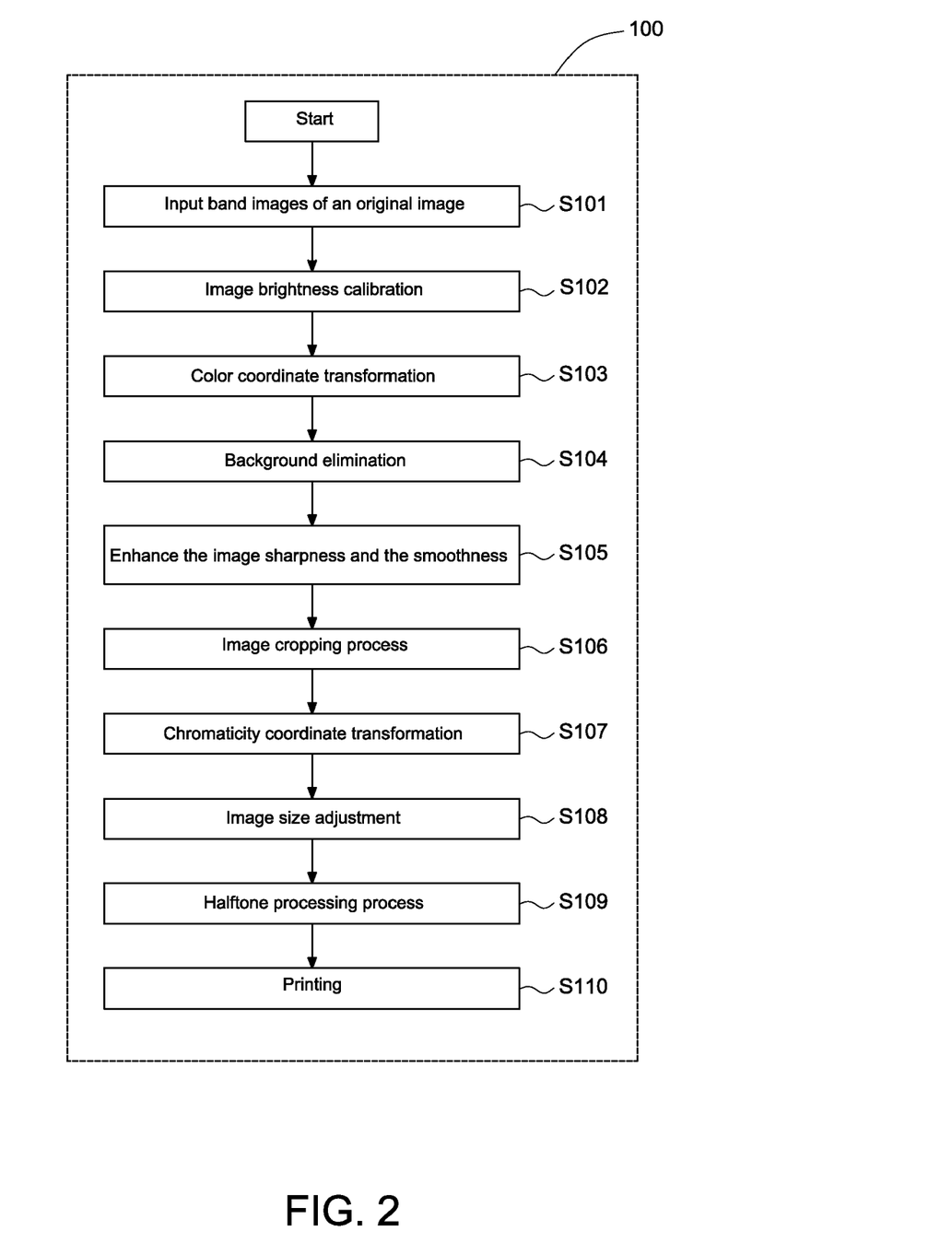
FIG. 2 is a flowchart illustrating an image processing method of a multifunction peripheral according to an embodiment of the present invention, in which the image processing method includes an image cropping process.

FIG. 2 is a flowchart illustrating an image processing method of a multifunction peripheral according to an embodiment of the present invention, in which the image processing method includes an image cropping process. The image processing method 100 comprises the following steps. Firstly, band images of an original image are inputted (Step S101). Then, an image brightness calibration process is performed (Step S102), and a color coordinate transformation is performed (Step S103). Then, a background elimination process is performed (Step S104). Then, Step S105 is performed to enhance the image sharpness and the smoothness. Then, an image cropping process is performed (Step S106), and a chromaticity coordinate transformation is performed (Step S107). After the image size is adjusted (Step S108) and a halftone processing process is done (Step S109), the processed image is printed (Step S110).

In accordance with a key feature of the present invention, the object image is cropped from the original image when the image processing method is implemented. That is, the present invention is aimed at the step S106 of performing the image cropping process. The other steps of the image processing method 100 are well known in the art, and are not redundantly described herein. Hereinafter, the step S106 of performing the image cropping process will be illustrated in more detail with reference to FIG. 3.

Figure 3:
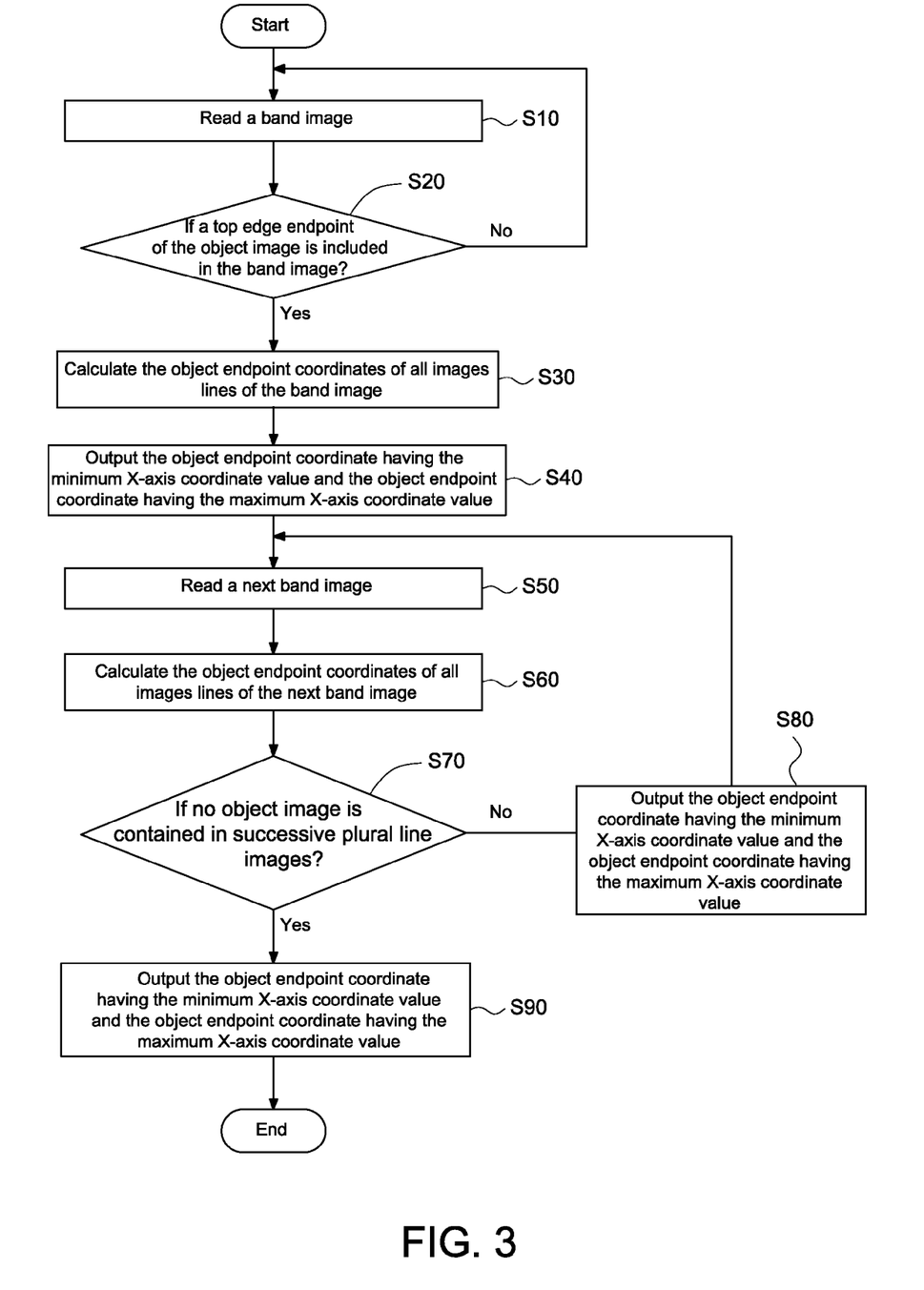
FIG. 3 is a flowchart illustrating an image cropping process according to an embodiment of the present invention.

FIG. 3 is a flowchart illustrating an image cropping process according to an embodiment of the present invention. Firstly, a band image is read (Step S10). Then, Step S20 is performed to judge whether a top edge endpoint of the object image is included in the read band image. If the judging condition is satisfied, Step S30 is performed. Whereas, if the judging condition is unsatisfied, Step S10 is repeatedly done until the top edge endpoint of the object image is included in any other read band image. In Step S30, the object endpoint coordinates of all images lines of the band image having the top edge endpoint are calculated. In Step S40, among all object endpoint coordinates of the band image having the top edge endpoint, the object endpoint coordinate having the minimum X-axis coordinate value and the object endpoint coordinate having the maximum X-axis coordinate value are outputted for further performing a printing processing operation. Then, a next band image is read (Step S50), and all object endpoint coordinates of all line images of the next band image are calculated (Step S60). Then, Step S70 is performed to judge whether no object image is contained in successive plural line images. If the judging condition is satisfied, Step S90 is performed. Whereas, if the judging condition is unsatisfied, Step S80 is performed. In Step S80, among all object endpoint coordinates of the band image, the object endpoint coordinate having the minimum X-axis coordinate value and the object endpoint coordinate having the maximum X-axis coordinate value are outputted for further performing a printing processing operation. In Step S90, among all object endpoint coordinates of the band image, the object endpoint coordinate having the minimum X-axis coordinate value and the object endpoint coordinate having the maximum X-axis coordinate value are outputted for further performing a printing processing operation. After Step S90 is done, the image cropping process is completed.

Hereinafter, the steps of the image cropping process as shown in FIG. 3 will be illustrated in more details.

Figure 4:
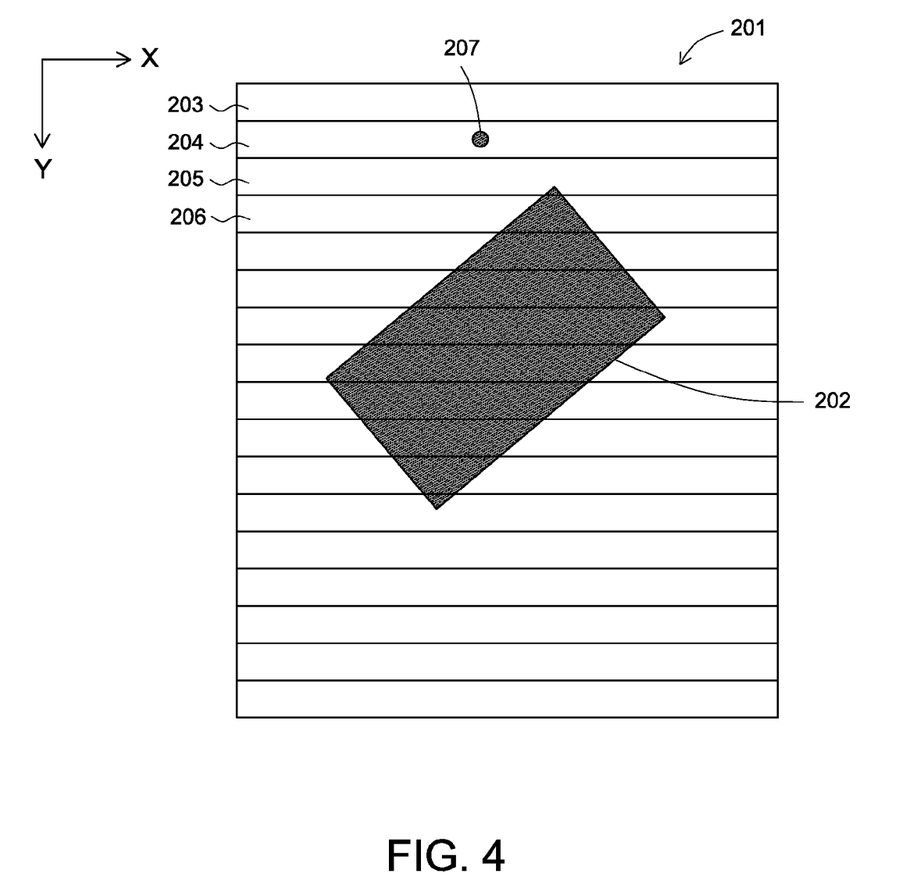
FIG. 4 schematically illustrates the definitions of an original image, an object image and a band image used in the image cropping process of the present invention.

FIG. 4 schematically illustrates the definitions of an original image, an object image and a band image used in the image cropping process of the present invention. The original image 201 denotes the image having the same size as the printed paper (e.g. an A4-sized paper). The object image denotes the image of the document to be printed (e.g. an A6-sized photo). The original image 201 is segmented into plural identical-sized band image portions. For brevity, only a first band image 203, a second band image 204, a third band image 205 and a fourth band image 206 are indicated in the drawing.

Figure 5A:
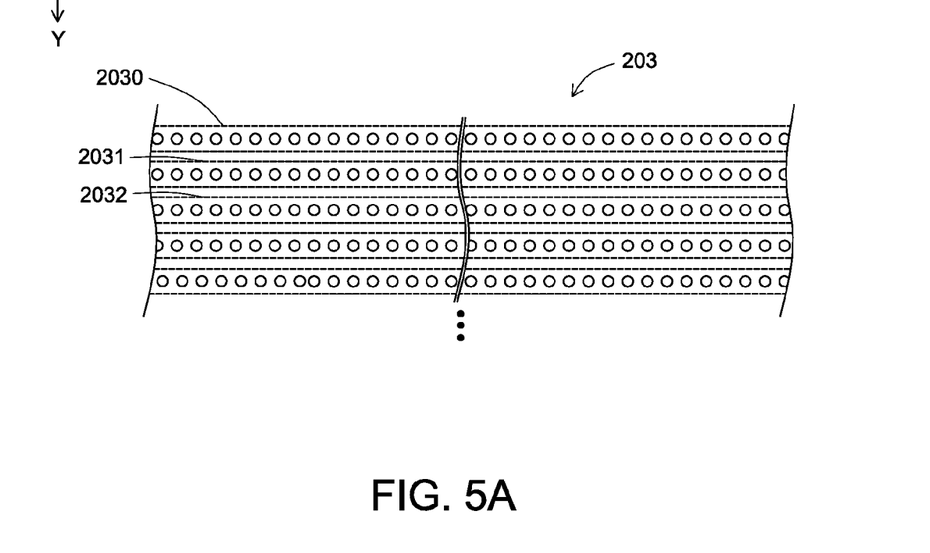
FIG. 5A schematically illustrates a portion of the first band image of the original image.

Hereinafter, the detailed contents of the first band image 203 of the original image 201 will be illustrated with reference to FIG. 5A. As shown in FIG. 5A, the first band image 203 comprises plural line images 2030, 2031, 2032, ..., and so on. Each line image comprises plural pixels. The background pixels (i.e. the pixels of the non-object image) are indicated by hollow circles. The pixels of the object image or the pixels of the spot's image are indicated by solid circles (see FIG. 6A).

For judging whether a top edge endpoint of the object image is included in the first read band image 203, it is necessary to judge whether the plural line images of the first read band image 203 contains the object pixels or not. The object pixels denote the pixels of the object image. The rest of the object pixels are referred as background pixels.

For judging whether a pixel is an object pixel, a preset grayscale value and a grayscale threshold value are defined. The preset grayscale value is set by the manufacturer. The grayscale threshold value is determined by the following approach.

The grayscale threshold value is obtained by calculating the grayscale values of the pixels of plural gamma-corrected line images of the band image. The grayscale threshold value denotes a reference grayscale value of the background pixel. That is, the pixel whose grayscale value is higher than the grayscale threshold value is determined as the background pixel, but the pixel whose grayscale value is lower than the grayscale threshold value is determined as the object pixel. The number of line images to be used for calculating the grayscale threshold value may be predetermined by the manufacturer.

For example, as shown in FIG. 5A, if the three line images 2030, 2031 and 2032 of the first band image 203 are used for calculating the grayscale threshold value, the line images 2030, 2031 and 2032 of the first band image 203 are successively read. Before the calculation of the grayscale threshold value, the line images 2030, 2031 and 2032 are gamma-corrected. The gamma correction technique is well known in the art, and is not redundantly described herein.

Figure 5B:
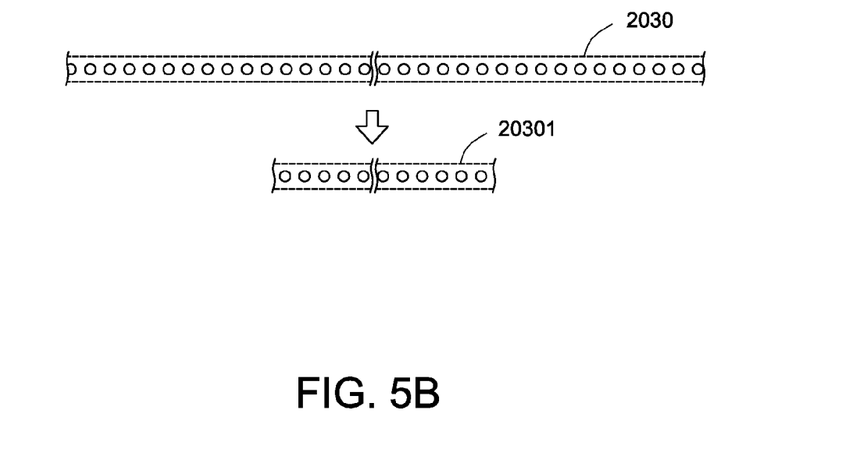
FIG. 5B schematically illustrates a way of judging whether an object pixel is included in the first band image.

Then, as shown in FIG. 5B, the gamma-corrected first line image 2030 is horizontally scaled down at a magnification (e.g. 1/64). After the gamma-corrected first line image 2030 is horizontally scaled down at the magnification of 1/64, a scaled-down first line image 20301 is acquired. In this situation, the arithmetic mean of the grayscale values of every 64 pixels of the first line image 2030 is calculated as a grayscale value of the scaled-down first line image 20301. For example, if the first line image 2030 originally has 6,400 pixels, after the first line image 2030 is horizontally scaled down at the magnification of 1/64, the scaled-down first line image 20301 has 100 grayscale values. Then, the maximum grayscale value among all pixels of the scaled-down first line image 20301 is recorded.

In an embodiment, the grayscale threshold value $W(n+1)$ is calculated by the following equation:

$$W(n+1)=W(n)+(W(n+1)\max-W(n))/T$$

In the above equation, $W(n)$ is an accumulated reference grayscale value of the $n^{th}$ line image, $W(n+1)\max$ indicates the maximum grayscale value among all pixels of the $(n+1)^{th}$ scaled-down line image that is obtained by horizontally scaling down the $(n+1)^{th}$ line image at a magnification, and $T$ is a positive integer. If $W(n+1)\max$ is higher than $W(n)$, $T=Td$. Whereas, if $W(n+1)\max$ is lower than $W(n)$, $T=Tu$. Tu and Td are different preset positive integers. The value $(n+1)$ is the number of line images to be used for calculating the grayscale threshold value. In this embodiment, since three line images are used for calculating the grayscale threshold value, $n=0, 1, 2$. If $n=0$, $W(n)=W(0)=$preset grayscale value.

The accumulated reference grayscale value of the first line image $W(1)$ may be obtained by the equation: $W(1)=W(0)+(W(1)\max-W(0))/T$. Since $W(0)$, $W(1)\max$ and $T$ are known, the accumulated reference grayscale value $W(1)$ of the first line image will be calculated.

Next, the gamma-corrected second line image 2031 is also horizontally scaled down at the magnification of 1/64. In addition, the maximum grayscale value among all pixels of the scaled-down second line image (not shown) is recorded. Since the accumulated reference grayscale value $W(1)$ of the first line image 2030 and the maximum grayscale value among all pixels of the scaled-down first line image 20301 are known, the accumulated reference grayscale value $W(2)$ of the second line image is obtained according to the above equation.

Next, the gamma-corrected third line image 2032 is also horizontally scaled down at the magnification of 1/64. In addition, the maximum grayscale value among all pixels of the scaled-down third line image (not shown) is recorded. Similarly, the accumulated reference grayscale value $W(3)$ of the third line image is obtained according to the above equation. The accumulated reference grayscale value $W(3)$ is the grayscale threshold value determined by the manufacturer according to the three line images. It is noted that the grayscale threshold value of the printed image may be calculated in every printing cycle.

After the grayscale threshold value is acquired, it is necessary to judge whether the first line image 2030 of the first band image 203 contains any object pixel. The line image 2030 is firstly read. Since the line images 2030, 2031 and 2032 have been gamma-corrected during the processing of determining the grayscale threshold value, it is not necessary to repeatedly perform the gamma correction on the line images 2030, 2031 and 2032 during the process of judging the object pixels. Since the remaindering line images have not been gamma-corrected, they must be gamma-corrected in the further processing step.

Please refer to FIG. 5B again. After the gamma-corrected first line image 2030 is read, the gamma-corrected first line image 2030 is horizontally scaled down at a magnification (e.g. 1/64) to acquire a scaled-down first line image 20301. As mentioned above, if the first line image 2030 originally has 6,400 pixels, after the first line image 2030 is horizontally scaled down at the magnification of 1/64, the scaled-down first line image 20301 has 100 grayscale values. Then, the grayscale values of the 100 pixels of the scaled-down first line image 20301 are successively compared with the grayscale threshold value. The pixels whose grayscale values are higher than the grayscale threshold value are determined as the background pixels. Whereas, the pixels whose grayscale values are lower than the grayscale threshold value are determined as the object pixels.

In accordance with the present invention, the way of judging whether the pixels are object pixels is performed by comparing the grayscale values of all pixels of the scaled-down line image with the grayscale threshold value. Since the line image is horizontally scaled down to acquire the scaled-down line image, the amount of grayscale values for comparison will be reduced. In this situation, the computing time of the multifunction peripheral will be reduced.

Next, among the object pixels of the scaled-down line image 20301, the coordinate value of the leftmost object pixel and the coordinate value of the rightmost object pixel are recorded. Then, the coordinate values of the leftmost object pixel and the rightmost object pixel of the scaled-down line image 20301 are respectively restored to the coordinate values of the leftmost object pixel and the rightmost object pixel of the line image 2030. Take the band image 203 as shown in FIG. 5 for example. Since the line images 2030, 2031, 2032 and other line images included in the band image 203 are non-object image, it means that the pixels of these line images are background pixels. In this situation, the grayscale values of all pixels of each scaled-down line image (e.g. the scaled-down line image 20301) are all higher than the grayscale threshold value. The process of restoring the coordinate values of the scaled-down line image to the coordinate values of the original line image will be illustrated later.

Since all of the line images includes in the first band image 203 do not contain the object pixels, no top edge endpoints are included in the first band image 203. Next, the next band image 204 is read, and the step S20 is performed to judge whether a top edge endpoint of the object image is included in the band image 204.

Figure 6A:
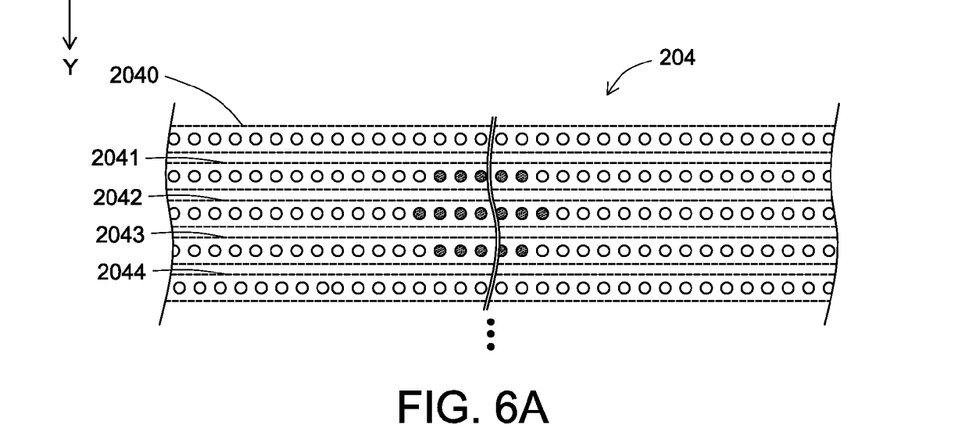
FIG. 6A schematically illustrates a portion of a second band image of the original image.
Figure 6B:
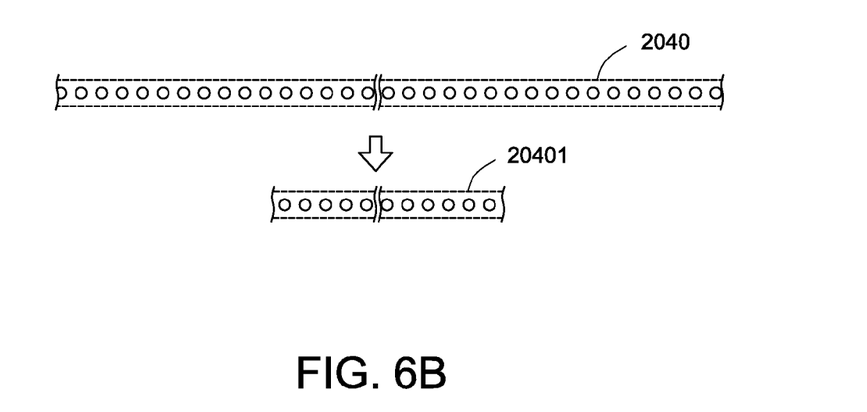
FIGS. 6B and 6C schematically illustrate a way of judging whether an object pixel is included in the second band image.

Hereinafter, a way of judging whether an object pixel is included in the second band image 204 will be illustrated with reference to FIGS. 6A, 6B and 6C. As shown in FIG. 6A, the second band image 204 comprises plural line images 2040, 2041, 2042, 2043, 2044, . . . , and so on. The three line images 2041, 2042 and 2043 are indicated by solid circles because they contain image information.

Firstly, an approach of judging whether the second band image 204 includes an object pixel is performed. The way of searching the object pixels of all line images of the second band image 204 is similar to the way of judging the first band image 203. As shown in FIG. 6B, the first line image 2040 of the second band image 204 is horizontally scaled down at a magnification (e.g. 1/64) to acquire a scaled-down first line image 20401. Then, the grayscale values of the 100 pixels of the scaled-down first line image 20401 are successively compared with the grayscale threshold value. The pixels whose grayscale values are lower than the grayscale threshold value are determined as the object pixels. Since none of the pixels of the scaled-down first line image 20401 are lower than the grayscale threshold value, all of the pixels of the first line image 2040 are background pixels.

Figure 6C:
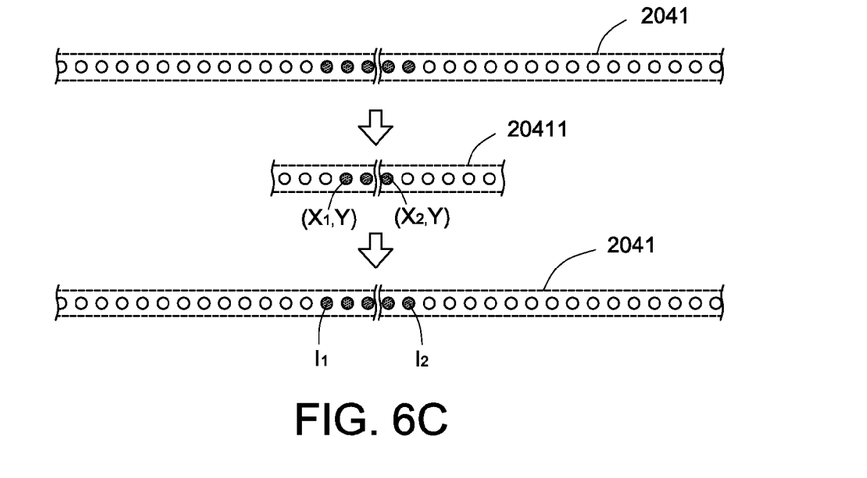

Please refer to FIG. 6C. Then, the next line image 2041 is read, and horizontally scaled down to acquire a scaled-down line image 20411. Then, the grayscale values of all pixels of the scaled-down line image 20411 are successively compared with the grayscale threshold value. As shown in FIG. 6C, the scaled-down line image 20411 includes some object pixels (i.e. the pixels indicated by solid circles). That is, pixels indicated by the solid circles are pixels whose grayscale values are lower than the grayscale threshold value. After all of the object pixels of the scaled-down line image 20411 are acquired, the coordinate value $(X_1, Y)$ of the leftmost object pixel and the coordinate value $(X_2, Y)$ of the rightmost object pixel of the scaled-down line image 20411 are recorded.

Next, the coordinate value $(X_1, Y)$ of the leftmost object pixel and the coordinate value $(X_2, Y)$ of the rightmost object pixel of the scaled-down line image 20411 are respectively converted into the coordinate value $I_1$ of the leftmost object pixel and the coordinate value $I_2$ of the rightmost object pixel of the line image 2041 according to the following formulae: $I_1=(64\times(X_1+1/2), Y)$, and $I_2=(64\times(X_2+1/2), Y)$.

Then, the coordinate value $I_1$ of the leftmost object pixel and the coordinate value $I_2$ of the rightmost object pixel of the line image 2041 are recorded.

Next, the steps of judging whether the remaindering line images following the first line image 2041 (e.g. the three line images 2042, 2043 and 2044 following the first line image 2041) contain object pixels are successively performed. If any of the three line images 2042, 2043 and 2044 contains the object pixels, the coordinate values of the leftmost object pixel and the rightmost object pixel of such line image are recorded.

Optionally, the step of judging whether a top edge endpoint of the object image is included in the read band image further includes a spot detecting process. As shown in FIG. 6A, the line images 2041, 2042 and 2043 are line images with object pixels, but on object pixels are included in the line image 2044. In accordance with the present invention, after the line image with the object pixels is firstly detected, it is necessary to judge whether the three line images following the first line image 2041 contain object pixels. In the band image 204 of FIG. 6A, not all of the three line images 2042, 2043 and 2044 following the first line image 2041 contain the object pixels. That is, only the two line image 2042 and 2043 contain the object pixels, but no object pixels are included in the line image 2044. In this situation, it is determined that the first line image 2041 does not contain the top edge endpoint. On the other hand, the object pixels included in the line images 2041, 2042 and 2043 are considered as spots and neglected.

Figure 7A:
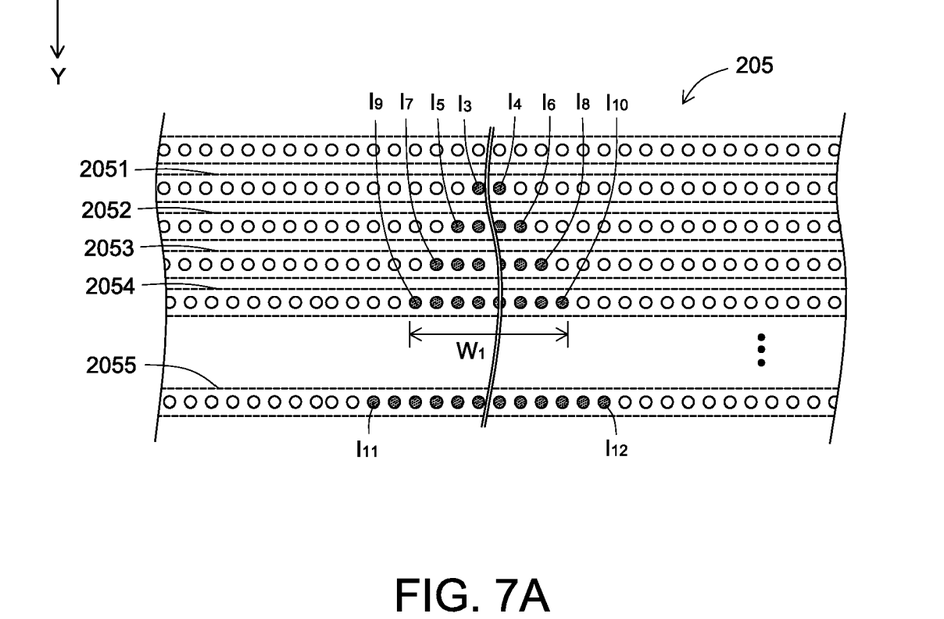
FIG. 7A schematically illustrates a portion of a third band image of the original image.

In FIG. 7A, a portion of a next band image 205 is shown. Since no top edge endpoint of the object image is included in the band images 203 and 204, the next band image 205 is read to judge whether a top edge endpoint of the object image is included in the band image 205.

As shown in FIG. 7A, the line image 2051 of the band image 205 contains object pixels. By the above-mentioned procedure of acquiring the coordinate values of the leftmost object pixel and the rightmost object pixel, the coordinate value $I_3$ of the leftmost object pixel and the coordinate value $I_4$ of the rightmost object pixel of the line image 2051 are acquired. For judging whether the object pixels of the line image 2051 are spots, it is necessary to judge whether the next three line images of the first line image 2051 contain object pixels. As shown in FIG. 7A, all of the next three line images 2052, 2053 and 2054 of the first line image 2051 contain the object pixels. Consequently, the coordinate values $I_5$ and $I_6$ of the two endpoint object pixels of the line image 2052, the coordinate values $I_7$ and $I_8$ of the two endpoint object pixels of the line image 2053 and the coordinate values $I_9$ and $I_{10}$ of the two endpoint object pixels of the line image 2054 are successively recorded.

For precisely judging whether the object image is a spot, it is necessary to judge whether all of the next plural line images of the first object-pixel-containing line image contain object pixels. In addition, the present invention further provides a spot detecting process for judging whether the detected object image is a spot. The spot detecting process is performed to judging whether the width between the coordinate values of two endpoint object pixels of at least one line image of the next plural line images is greater than a preset width value (e.g. 6 pixel width). As shown in FIG. 7A, the width $W_1$ between the coordinate values $I_9$ and $I_{10}$ of the two endpoint object pixels of the line image 2054 is greater than the preset width value (e.g. 6 pixel width), the object pixels included in the line images 2051, 2052, 2053 and 2054 are not spots' images. In this situation, the coordinate values $I_3$ and $I_4$ of the two endpoint object pixels of the line image 2051 are the coordinate values of the top edge endpoint of the object images.

The strategy of judging whether the object pixels are spots will be illustrated as follows. Generally, the image information of the object image is usually continuous and widespread, but the image information of the spot is usually discontinuous and has a narrow scope. If the object pixel of the first line image is really at the top edge of the object image, the plural successive line image following the top edge of the object image may contain the object pixels with the image information of the object image. Moreover, the width between the coordinate values of two endpoint object pixels denotes a scope of the object image. That is, by judging whether the plural successive line image contain the object pixels, and then judging whether the width between the coordinate values of two endpoint object pixels of at least one line image is greater than the preset width value, the detected object pixels may be determined as either the top edge of the object image or the spots.

After the line image 2051 is determined as the top edge of the object image, the coordinate values of respective two endpoint object pixels of the line images following the line image 2054 of the third band image 205 are successively calculated. In addition, the coordinate values of respective two endpoint object pixels of these line images are recorded until the last line images 2055 of the third band image 205 are recorded. As shown in FIG. 7A, the two endpoint object pixels of the last line image 2055 has coordinate values $I_{11}$ and $I_{12}$.

Figure 7B:
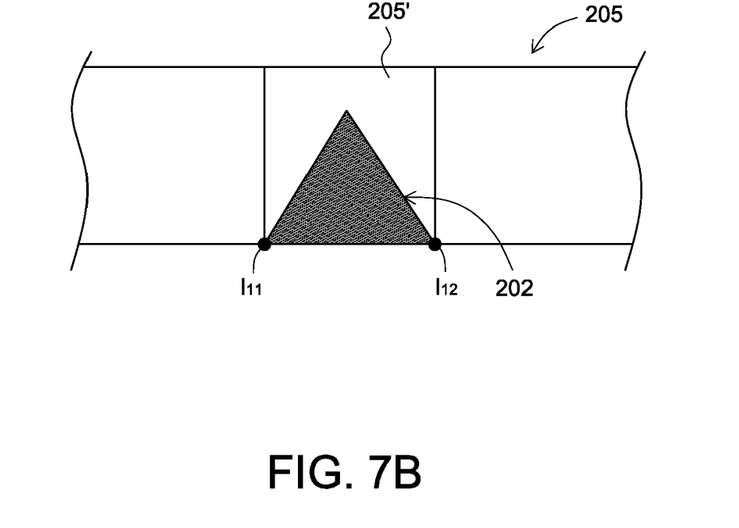
FIG. 7B schematically illustrates a way of cropping the third band image to acquire an object image zone.

Next, among the endpoint object pixels of the third band image 205, the endpoint object pixel having the minimum X-axis coordinate value and the endpoint object pixel having the maximum X-axis coordinate value are outputted. For example, as shown in FIG. 7A, the coordinate values of the endpoint object pixels of the third band image 205 comprise the coordinate values $I_3$ and $I_4$ of the two endpoint object pixels of the line image 2051, the coordinate values $I_5$ and $I_6$ of the two endpoint object pixels of the line image 2052, the coordinate values $I_5$ and $I_6$ of the two endpoint object pixels of the line image 2052, the coordinate values $I_7$ and $I_8$ of the two endpoint object pixels of the line image 2053 and the coordinate values $I_9$ and $I_{10}$ of the two endpoint object pixels of the line image 2054, . . . , and the coordinate values $I_{11}$ and $I_{12}$ of the two endpoint object pixels of the last line image 2055. The coordinate values of the endpoint object pixel having the minimum X-axis coordinate value and the endpoint object pixel having the maximum X-axis coordinate value are respectively the coordinate values $I_{11}$ and $I_{12}$ of the two endpoint object pixels of the last line image 2055. Please refer to FIG. 7B. According to the coordinate value $I_{11}$ of the endpoint object pixel having the minimum X-axis coordinate value and the coordinate value $I_{12}$ of the endpoint object pixel having the maximum X-axis coordinate value, a Y-direction cropping operation is performed on the third band image 205 to acquire an object image zone 205'. Then, the object image zone 205' is further processed by the remaindering steps of the image processing method, including the chromaticity coordinate transformation (Step S107), the image size adjustment (Step S108), the halftone processing procedure (Step S109) and the printing procedure (Step S110).

Figure 8A:
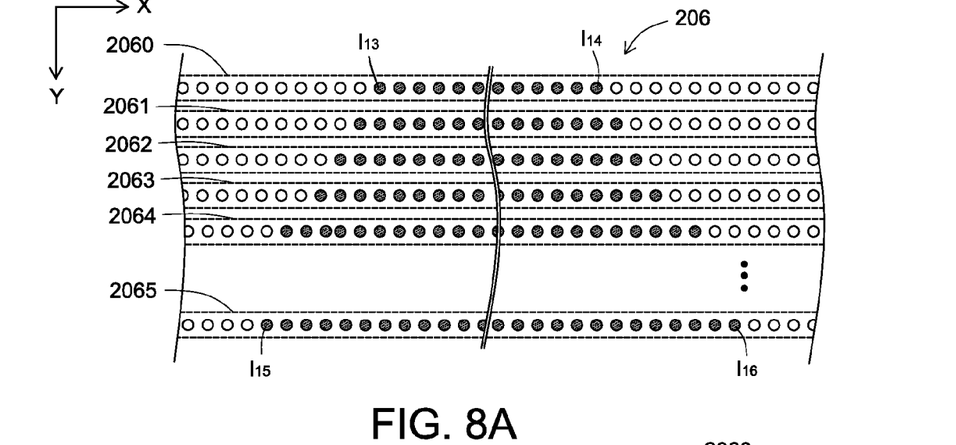
FIG. 8A schematically illustrates a portion of a fourth band image of the original image.

After the third band image 205 is processed, a fourth band image 206 is successively read. Hereinafter, a way of processing the fourth band image 206 will be illustrated with reference to FIGS. 8A, 8B and 8C. As shown in FIG. 8A, the fourth band image 206 comprises plural line images 2060, 2061, 2462, 2063, . . . , and so on. Since the endpoint object pixels have been acquired, it is not necessary to repeatedly perform the step of detecting the top edge endpoint. Whereas, it is necessary to calculate the coordinate values of the leftmost object pixel and the rightmost object pixel of each line image of the fourth band image 206.

Figure 8B:
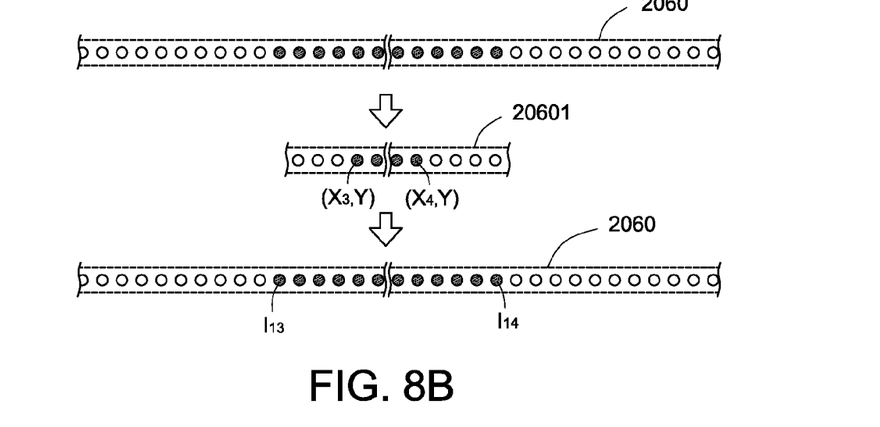
FIG. 8B schematically illustrates a way of judging whether an object pixel is included in the fourth band image.

The procedure of calculating the coordinate values of the two endpoint object pixels of each line image of the fourth band image 206 will be illustrated as follows. Similarly, take the line image 2060 for example. The line image 2060 is horizontally scaled down to acquire a scaled-down line image 20601. Then, the coordinate values $(X_3,Y)$ and $(X_4,Y)$ of the two endpoint object pixels of the scaled-down line image 20601 are calculated. Then, the coordinate values $(X_3,Y)$ and $(X_4,Y)$ are restored to the coordinate system of the line image 2060, so that the coordinate values $I_{13}$ and $I_{14}$ of the two endpoint object pixels of the line image 2060 are acquired. The above procedure is repeatedly performed on the remaindering line images of the band image 206 until the coordinate values $I_{15}$ and $I_{16}$ of the two endpoint object pixels of the last line image 2065 are acquired.

Figure 8C:
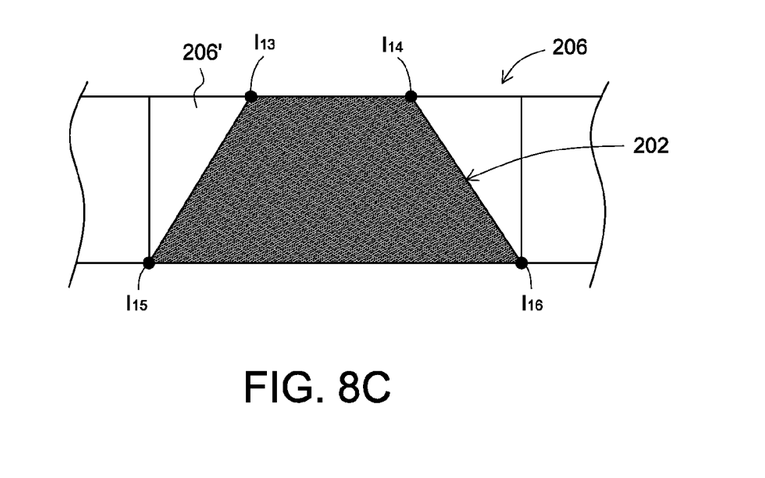
FIG. 8C schematically illustrates a way of cropping the third band image to acquire an object image zone.

Next, among the endpoint object pixels of the fourth band image 206, the endpoint object pixel having the minimum X-axis coordinate value and the endpoint object pixel having the maximum X-axis coordinate value are outputted. As shown in FIG. 8A, among the endpoint object pixels of the fourth band image 206, the coordinate value of the endpoint object pixel having the minimum X-axis coordinate value is $I_{15}$, and the endpoint object pixel having the maximum X-axis coordinate value is $I_{16}$. According to the coordinate value $I_{15}$ and $I_{16}$ a Y-direction cropping operation is performed on the fourth band image 206 to acquire an object image zone 206'. Then, the object image zone 206' is further processed by the remaindering steps of the image processing method.

The remaindering steps of processing the plural band images following the fourth band image 206 are similar to those of processing the fourth band image 206, and are not redundantly described herein.

Figure 9:
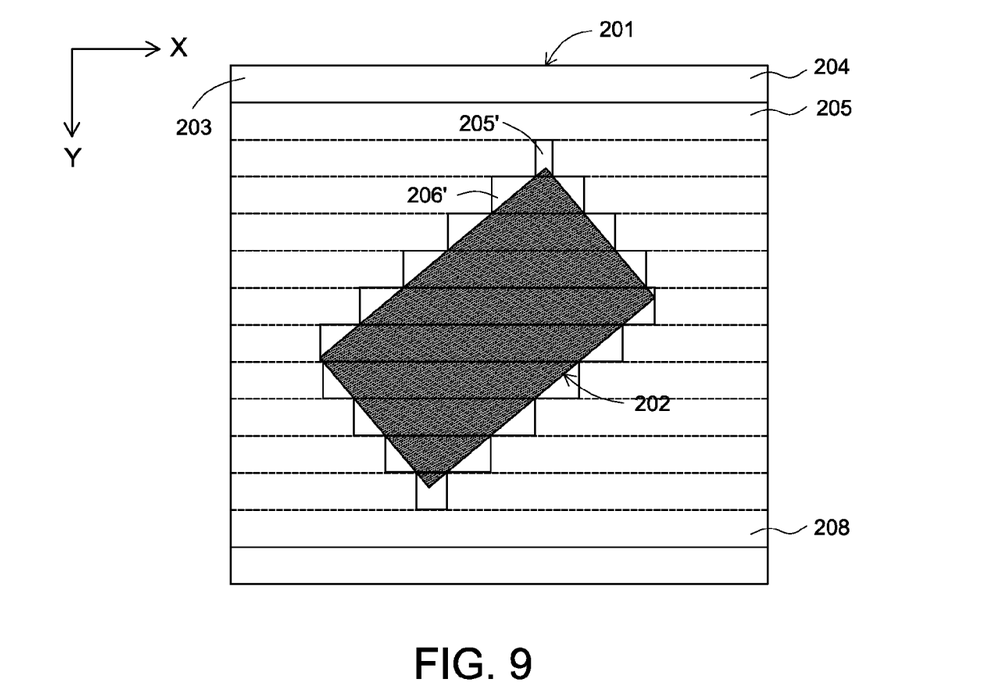
FIG. 9 schematically illustrates the object image zones acquired by the image cropping process of the present invention.

FIG. 9 schematically illustrates the object image zones acquired by the image cropping process of the present invention. The object image zones (e.g. 205' and 206') are shown with respect to the whole original image 201. As shown in FIG. 9, the object image zones (e.g. 205' and 206') comprise a majority of the pixels of the object image 202. The background pixels not belonging to the object image are not sent to the printing module to be printed. As a consequence, the printing speed of the multifunction peripheral will be enhanced.

After most band images are processed, if the line image with no object pixel is detected again, it means that the band images containing the object pixels may be completely detected and no object image is contained in a further band image. In other words, if the line image with no object pixel is detected again, for example no object pixel is included in the successive plural line images, it means that the object image has been completely read and the remaindering band images belong to the background image. Meanwhile, the image cropping process is ended, and it is not necessary to process the further band images. Consequently, the printing speed is enhanced.

Figure 10:
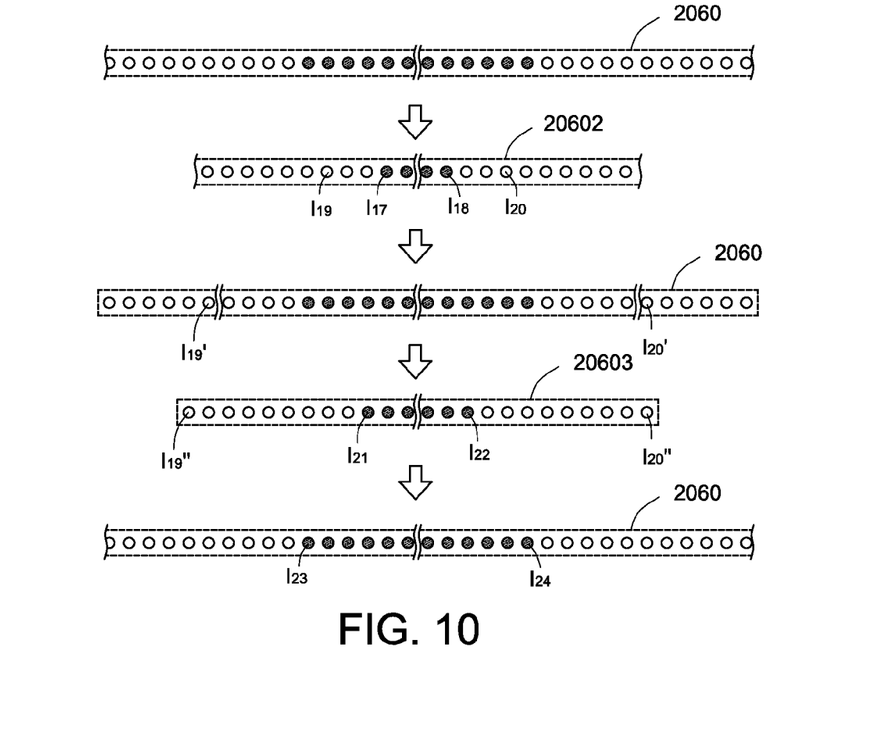
FIG. 10 schematically illustrates a process of judging whether the plural line images contain object pixels according to another embodiment of the present invention.

The present invention further provides another embodiment of detecting the object pixels. FIG. 10 schematically illustrates a process of judging whether the plural line images contain object pixels according to another embodiment of the present invention. Take the first line image 2060 of the band image 206 for example. In the process of detecting the object pixels of this embodiment, the line image is horizontally scaled down for two times to judge whether the line image contains the object pixels. Firstly, the line image 2060 is read. Then, the line image 2060 is gamma-corrected. Then, the gamma-corrected line image 2060 is horizontally scaled down at a first magnification (e.g. ⅙) to acquire a first scaled-down line image 20602. Then, the grayscale values of all pixels of the first scaled-down line image 20602 are successively compared with a grayscale threshold value. The pixel whose grayscale value is lower than the grayscale threshold value is determined as a would-be object pixel. Then, the coordinate value $I_{17}$ ($X_5$, Y) of the leftmost would-be object pixel and the coordinate value $I_{18}$ ($X_6$, Y) of the rightmost would-be object pixel of the first scaled-down line image 20602 are recorded. Meanwhile, the first horizontally scaling-down operation is completed. Next, a predetermined value (e.g. three pixels) is subtracted from the coordinate value $I_{17}$ of the leftmost would-be object pixel of the first scaled-down line image 20602, thereby acquiring a left reference coordinate $I_{19}$ ($X_5$−3, Y). In addition, the coordinate value $I_{18}$ of the rightmost would-be object pixel of the first scaled-down line image 20602 is added by the predetermined value, thereby acquiring a right reference coordinate $I_{20}$ ($X_6$+3, Y). Then, the left reference coordinate $I_{19}$ and the right reference coordinate $I_{20}$ are respectively restored to the leftmost reference coordinate $I_{19}'$ and the rightmost reference coordinate $I_{20}'$ of the line image 2060. The line image between the leftmost reference coordinate $I_{19}'$ and the rightmost reference coordinate $I_{20}'$ is horizontally scaled down at a second magnification (e.g. ⅓) to acquire a second scaled-down line image 20603. Meanwhile, the second horizontally scaling-down operation is completed. The left endpoint coordinate and the right endpoint coordinate of the second scaled-down line image 20603 are respectively $I_{19}''$ (6/3×($X_5$−3), Y) and $I_{20}''$ ((6/3×($X_6$+3)+(6/3−1)), Y). Then, the grayscale values of all pixels of the second scaled-down line image 20603 are successively compared with the grayscale threshold value. The pixel whose grayscale value is lower than the grayscale threshold value is determined as an object pixel. Then, the coordinate value $I_{21}$ ($X_7$, Y) of the leftmost object pixel and the coordinate value $I_{22}$ ($X_8$, Y) of the rightmost object pixel of the second scaled-down line image 20603 are recorded. Then, the coordinate value $I_{21}$ ($X_7$, Y) of the leftmost object pixel and the coordinate value $I_{22}$ ($X_8$, Y) of the rightmost object pixel of the second scaled-down line image 20603 are respectively restored to the leftmost reference coordinate $I_{23}$ (3×($X_7$+1/2), Y) and the rightmost reference coordinate $I_{24}$ (3×($X_8$+1/2), Y) of the line image 2060. The leftmost reference coordinate $I_{23}$ and the rightmost reference coordinate $I_{24}$ of the line image 2060 are recorded as the two object endpoint coordinates.

In this embodiment, two horizontally scaling-down operations may obviate the possible problems encountered from the single horizontally scaling-down operation. If the single horizontally scaling-down operation is performed at a low magnification, the use of the arithmetic mean of the grayscale values to obtain a grayscale value of the scaled-down line image may over-corrode the coordinate values of the rightmost object pixel and the leftmost object pixel, or even neglect the endpoint object pixels. For example, if the first magnification is 1/64, the grayscale values of 64 pixels are converted to 1 grayscale value at each time. If these 64 pixels contain object pixels, the converted grayscale value may be larger than the grayscale threshold value, and thus these 64 pixels are all determined as the background pixels. For acquiring more precise coordinate values of the rightmost object pixel and the leftmost object pixel of the line image, the range between the left endpoint coordinate and the right endpoint coordinate of the would-be object pixels obtained by the first horizontally scaling-down operation is broadened by subtracting or adding the predetermined value according to this embodiment. In such way, the pixels that are determined as the background pixels outside the line image will be omitted. Afterwards, a second horizontally scaling-down operation is performed on the line image at a second magnification. The second magnification is greater than the first magnification. As a consequence, the object pixels can be judge more precisely while reducing the computing amount of the multifunction peripheral.

In the practical application, the image cropping process of the present invention may be implemented by a firmware that is installed in a multifunction peripheral. Since the real-time image cropping process of the present invention is added to the image processing method of the multifunction peripheral, the position of the object image zone in the band image can be effectively realized and the spots' image can be eliminated. Since the object image zone in the band image is effectively cropped during the image processing method is implemented, the time of printing the document is reduced. Moreover, since the original image is processed on a band image basis and only the object image zone is processed without the need of processing the background zone, the capacity of the dynamic memory required in the printing process is saved. Even if the system resource and the memory of the multifunction peripheral are limited, the image cropping process of the present invention can enhance the performance of the multifunction peripheral.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image cropping process of a multifunction peripheral, said multifunction peripheral being configured to scan a document to acquire an original image and print said original image, said original image comprising an object image, said original image being segmented into plural band images, each of said band images comprising plural line images, said image cropping process comprising steps of:
   (A) reading a band image of said original image;
   (B) judging whether a top edge endpoint coordinate of said object image is included in said read band image by sub-steps of:
      (B1) searching a first line image containing said object image from said read band image, and calculating two object endpoint coordinates of said first line image containing said object image;

(B2) successively judging whether all of next plural line images of said first line image contain said two object endpoint coordinates;

(B3) judging whether a width between two object endpoint coordinates of at least one line image of said next plural line images is greater than a preset width value, wherein if all of said judging conditions of said steps (B1), (B2) and (B3) are satisfied, each of said two object endpoint coordinates of said first line image is determined as said top edge endpoint coordinate, wherein if one of said judging conditions of said steps (B1), (B2) and (B3) is unsatisfied, said steps (A) and (B) are repeatedly performed until said top edge endpoint coordinate is determined;

(C) calculating object endpoint coordinates of all line images following said plural line images of said band image;

(D) outputting said object endpoint coordinate having the minimum X-axis coordinate value and said object endpoint coordinate having the maximum X-axis coordinate value among all object endpoint coordinates of said band image;

(E) receiving said object endpoint coordinates outputted in said step (D) for further performing a printing processing operation;

(F) reading a next band image, and searching all object endpoint coordinates of all line images of said next band image;

(G) outputting said object endpoint coordinate having the minimum X-axis coordinate value and said object endpoint coordinate having the maximum X-axis coordinate value among all object endpoint coordinates of said next band image;

(H) receiving said object endpoint coordinates outputted in said step (H) for further performing said printing processing operation; and (I) repeatedly performing said steps (F), (G) and (H).

2. The image cropping process according to claim 1 wherein said step (B1) comprises sub-steps of:

(B1-1) reading a line image of said band image, and performing a Gamma correction on said line image, wherein said line image comprises plural pixels;

(B1-2) judging whether said pixels of said line image contain said object image by horizontally scaling down said line image at a magnification to acquire a scaled-down line image, comparing grayscale values of respective pixels of said scaled-down line image with a grayscale threshold value to determine said pixel whose grayscale value is lower than said grayscale threshold value as an object pixel, and recording coordinates values of a leftmost object pixel and a rightmost object pixel of said object pixels of said scaled-down line image; and (B1-3) performing a pixel coordinate transformation by respectively transforming said coordinates values of said leftmost object pixel and said rightmost object pixel of said object pixels of said scaled-down line image into coordinates values of a leftmost object pixel and a rightmost object pixel of said object pixels of said line image, and recording said coordinates values of said leftmost object pixel and said rightmost object pixel of said object pixels of said line image as said two object endpoint coordinates.

3. The image cropping process according to claim 2 wherein said grayscale threshold value W(n+1) is calculated by the following equation:

$$W(n+1)=W(n)+(W(n+1)\max-W(n))/T$$

where, n=0, 1, 2, ..., (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

4. The image cropping process according to claim 3 wherein if W(n+1)max is higher than W(n), T=Td, and if W(n+1)max is lower than W(n), T=Tu, wherein Tu and Td are different positive integers.

5. The image cropping process according to claim 1 wherein said step (B1) comprises sub-steps of:

(B1-1) reading a line image of said band image, and performing a Gamma correction on said line image, wherein said line image comprises plural pixels;

(B1-2) judging whether said pixels of said line image contain said object image by:

horizontally scaling down said line image at a first magnification to acquire a first scaled-down line image;

comparing grayscale values of respective pixels of said first scaled-down line image with a grayscale threshold value to determine said pixel whose grayscale value is lower than said grayscale threshold value as a would-be object pixel, and recording coordinates values of a leftmost would-be object pixel and a rightmost would-be object pixel of said would-be object pixels of said first scaled-down line image;

subtracting a predetermined value from a X-axis coordinate value of said leftmost would-be object pixel of said first scaled-down line image to acquire a left reference coordinate, and adding said predetermined value to a X-axis coordinate value of said rightmost would-be object pixel to acquire a right reference coordinate; and respectively transforming said left reference coordinate and said right reference coordinate into a leftmost reference coordinate and a rightmost reference coordinate of said line image, horizontally scaling down said line image between said leftmost reference coordinate and said rightmost reference coordinate at a second magnification to acquire a second scaled-down line image, comparing grayscale values of respective pixels of said second scaled-down line image with said grayscale threshold value to determine said pixel whose grayscale value is lower than said grayscale threshold value as an object pixel, and recording coordinates values of a leftmost object pixel and a rightmost object pixel of said second scaled-down line image, wherein said second magnification is greater than said first magnification; and (B1-3) performing a pixel coordinate transformation by respectively transforming said coordinates values of said leftmost object pixel and said rightmost object pixel of said second scaled-down line image into coordinates values of a leftmost object pixel and a rightmost object pixel of said object pixels of said line image, and recording said coordinates values of said leftmost object pixel and said rightmost object pixel of said object pixels of said line image as said two object endpoint coordinates.

6. The image cropping process according to claim 5 wherein said grayscale threshold value W(n+1) is calculated by the following equation:

$$W(n+1)=W(n)+(W(n+1)\max-W(n))/T$$

where, n=0, 1, 2, ..., (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

7. The image cropping process according to claim 6 wherein if W(n+1)max is higher than W(n), T=Td, and if W(n+1)max is lower than W(n), T=Tu, wherein Tu and Td are different positive integers.

8. The image cropping process according to claim 1 wherein said step (F) comprises sub-steps of:
   (F-1) reading a line image of said next band image, and performing a Gamma correction on said line image, wherein said line image comprises plural pixels;
   (F-2) judging whether said pixels of said line image contain said object image by horizontally scaling down said line image at a magnification to acquire a scaled-down line image, comparing grayscale values of respective pixels of said scaled-down line image with a grayscale threshold value to determine said pixel whose grayscale value is lower than said grayscale threshold value as an object pixel, and recording coordinates values of a leftmost object pixel and a rightmost object pixel of said object pixels of said scaled-down line image; and
   (F-3) performing a pixel coordinate transformation by respectively transforming said coordinates values of said leftmost object pixel and said rightmost object pixel of said object pixels of said scaled-down line image into coordinates values of a leftmost object pixel and a rightmost object pixel of said object pixels of said line image, and recording said coordinates values of said leftmost object pixel and said rightmost object pixel of said object pixels of said line image as said two object endpoint coordinates.

9. The image cropping process according to claim 8 wherein said grayscale threshold value W(n+1) is calculated by the following equation:

$$W(n+1) = W(n) + (W(n+1)\max - W(n))/T$$

where, n=0, 1, 2, ..., (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

10. The image cropping process according to claim 9 wherein if W(n+1)max is higher than W(n), T=Td, and if W(n+1)max is lower than W(n), T=Tu, wherein Tu and Td are different positive integers.

11. The image cropping process according to claim 1 wherein said step (F) comprises sub-steps of:
   (F-1) reading a line image of said next band image, and performing a Gamma correction on said line image, wherein said line image comprises plural pixels;
   (F-2) judging whether said pixels of said line image contain said object image by:
      horizontally scaling down said line image at a first magnification to acquire a first scaled-down line image;
      comparing grayscale values of respective pixels of said first scaled-down line image with a grayscale threshold value to determine said pixel whose grayscale value is lower than said grayscale threshold value as a would-be object pixel, and recording coordinates values of a leftmost would-be object pixel and a rightmost would-be object pixel of said would-be object pixels of said first scaled-down line image;
      subtracting a predetermined value from a X-axis coordinate value of said leftmost would-be object pixel of said first scaled-down line image to acquire a left reference coordinate, and adding said predetermined value to a X-axis coordinate value of said rightmost would-be object pixel to acquire a right reference coordinate; and
      respectively transforming said left reference coordinate and said right reference coordinate into a leftmost reference coordinate and a rightmost reference coordinate of said line image, horizontally scaling down said line image between said leftmost reference coordinate and said rightmost reference coordinate at a second magnification to acquire a second scaled-down line image, comparing grayscale values of respective pixels of said second scaled-down line image with said grayscale threshold value to determine said pixel whose grayscale value is lower than said grayscale threshold value as an object pixel, and recording coordinates values of a leftmost object pixel and a rightmost object pixel of said second scaled-down line image, wherein said second magnification is greater than said first magnification; and
   (B1-3) performing a pixel coordinate transformation by respectively transforming said coordinates values of said leftmost object pixel and said rightmost object pixel of said second scaled-down line image into coordinates values of a leftmost object pixel and a rightmost object pixel of said object pixels of said line image, and recording said coordinates values of said leftmost object pixel and said rightmost object pixel of said object pixels of said line image as said two object endpoint coordinates.

12. The image cropping process according to claim 11 wherein said grayscale threshold value W(n+1) is calculated by the following equation:

$$W(n+1) = W(n) + (W(n+1)\max - W(n))/T$$

where, n=0, 1, 2, ..., (A-1), W(0) is an initial grayscale value, W(n) is an accumulated reference grayscale value of the $n^{th}$ line image, W(n+1)max indicates the maximum grayscale value among all pixels of the $(n+1)^{th}$ scaled-down line image that is obtained by horizontally scaling down the $(n+1)^{th}$ line image at a magnification, and T and A are positive integers.

13. The image cropping process according to claim 12 wherein if W(n+1)max is higher than W(n), T=Td, and if W(n+1)max is lower than W(n), T=Tu, wherein Tu and Td are different positive integers.

\* \* \* \* \*